(12) United States Patent
Shimazu

(10) Patent No.: US 6,577,950 B2
(45) Date of Patent: Jun. 10, 2003

(54) ROUTE GUIDING EXPLANATION DEVICE AND ROUTE GUIDING EXPLANATION SYSTEM

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/755,867

(22) Filed: Jan. 5, 2001

(65) Prior Publication Data

US 2001/0007968 A1 Jul. 12, 2001

(30) Foreign Application Priority Data

Jan. 12, 2000 (JP) ........................................ 2000/003110

(51) Int. Cl.7 .............................................. G09B 29/10
(52) U.S. Cl. ........................ 701/211; 701/201; 701/206; 701/213
(58) Field of Search ................................ 701/211, 200, 701/201, 202, 206, 207, 208, 213; 340/990, 995; 342/357.3; 345/173, 121

(56) References Cited

U.S. PATENT DOCUMENTS 4,878,170 A * 10/1989 Zeevi ........................ 701/211
6,078,865 A * 6/2000 Koyanagi ................... 701/211

* cited by examiner

Primary Examiner—Thomas G. Black
Assistant Examiner—Arthur D. Donnelly
(74) Attorney, Agent, or Firm—Scully, Scott, Murphy & Presser

(57) ABSTRACT

To provide a route guiding explanation device capable of adding or changing route information data or the like by general users without requiring any CPU of high-level function and any large number of memories. A destination absolute position storing portion stores latitude and longitude information of a destination converted by a destination absolute position converting portion. A present location neighboring landmark storing portion selects and stores a landmark name which is a most nearest to the latitude and longitude information of the present location absolute position storing portion. A destination neighboring landmark storing portion selects and stores the landmark name which is a most nearest to the latitude and longitude information of the destination absolute position storing portion. A landmark section travel explanation renewing portion regards a value of the present location neighboring landmark storing portion as a starting point landmark and the value of the destination neighboring landmark storing portion as a destination landmark and takes out the explanations from the landmark section travel explanation storing portion and renews the explanations for a driver.

17 Claims, 6 Drawing Sheets

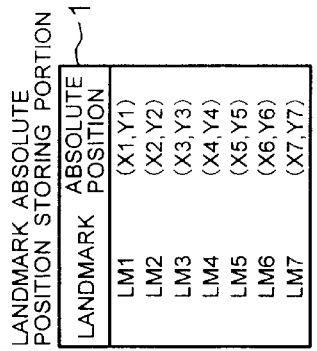
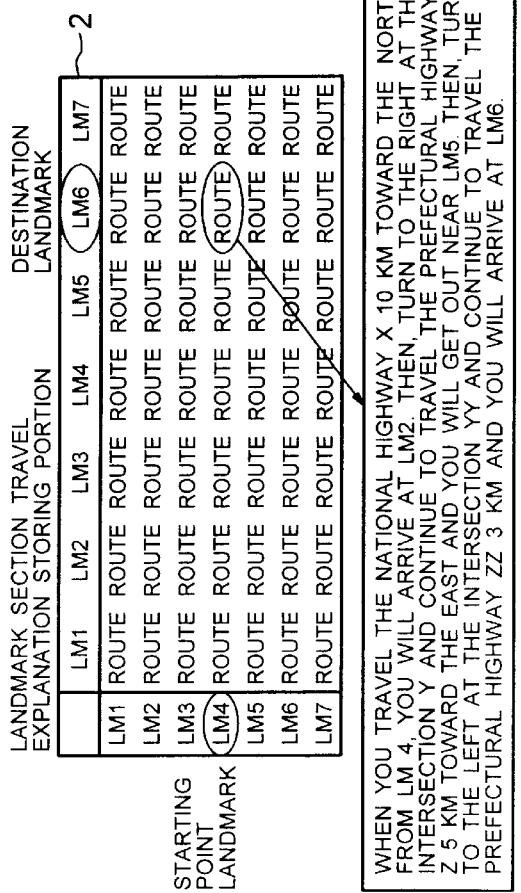
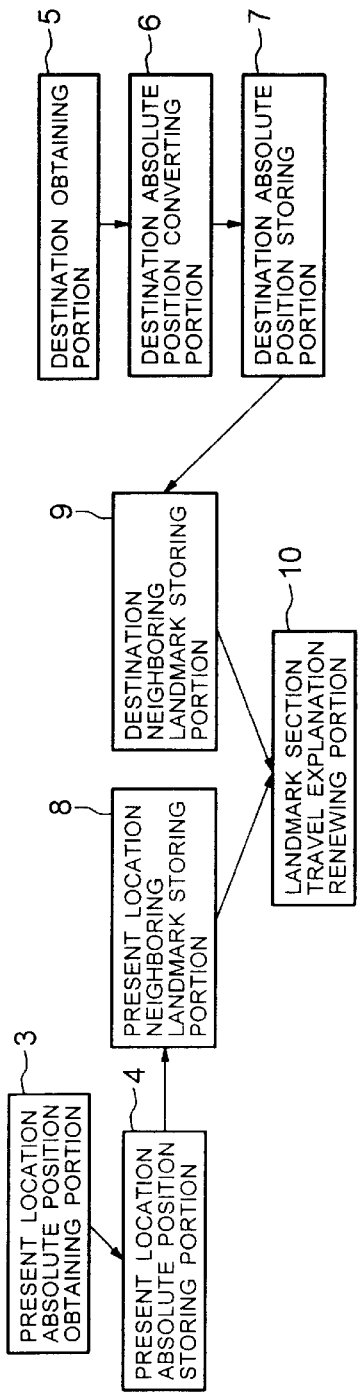

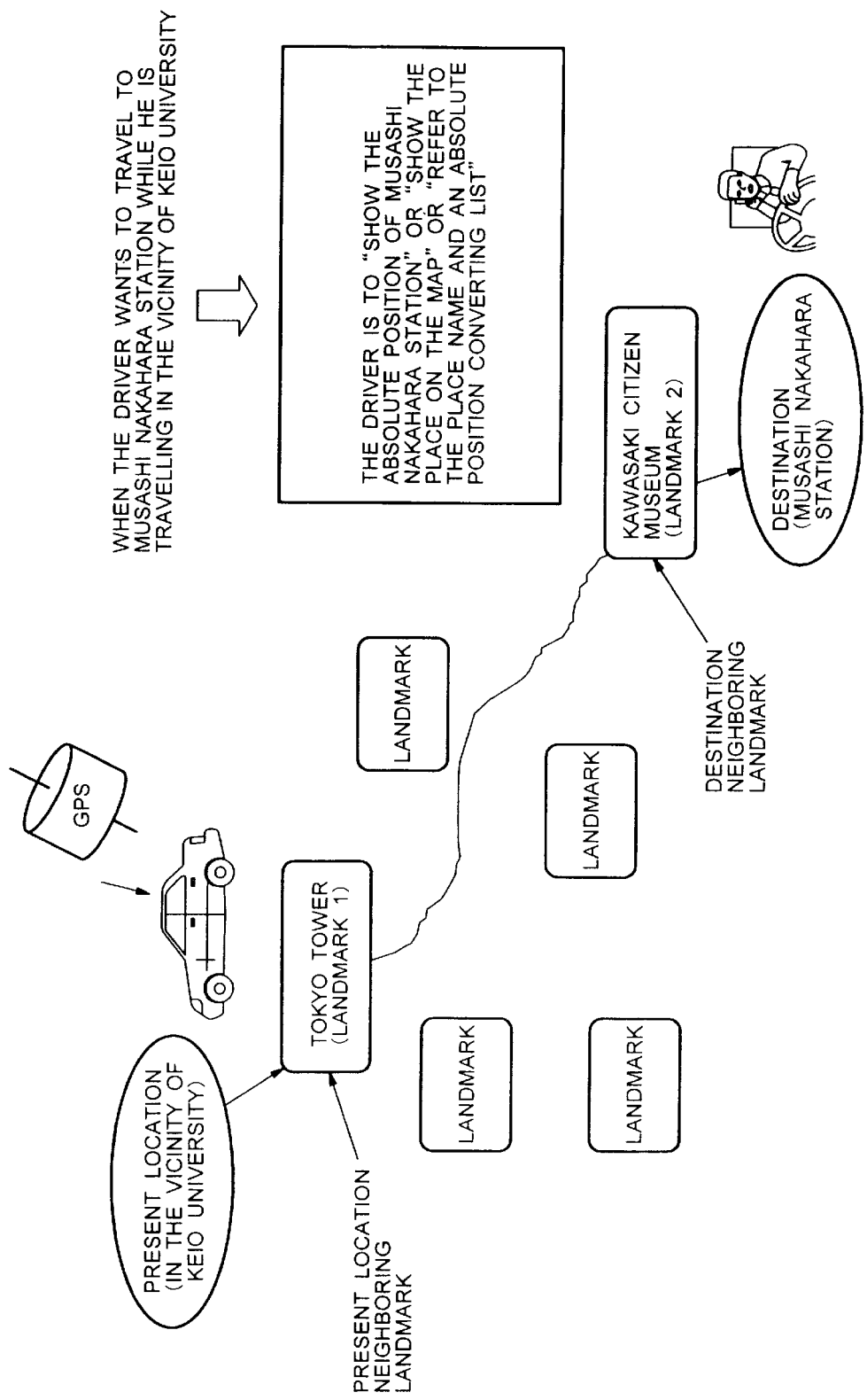

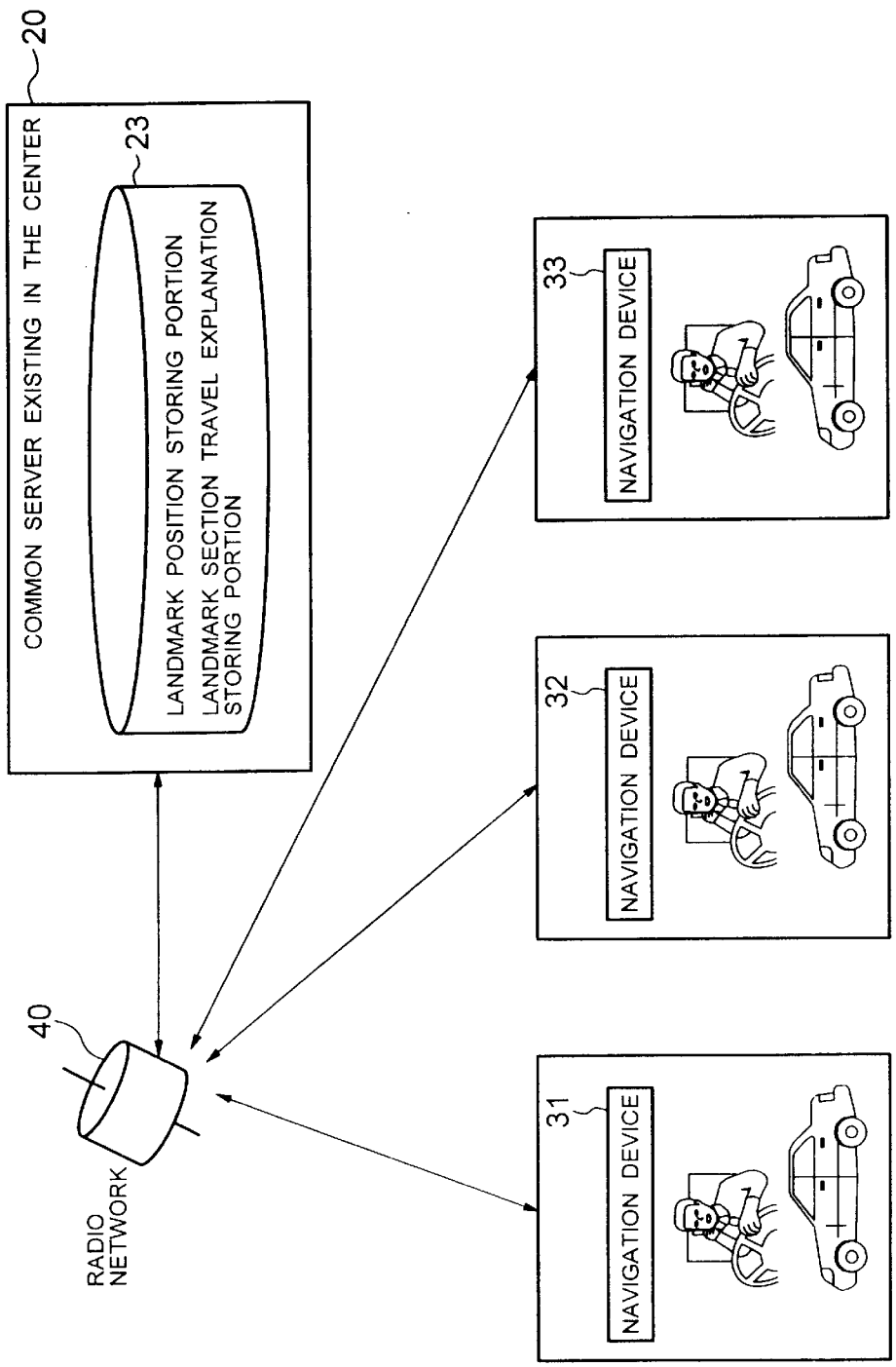

ROUTE GUIDING EXPLANATION DEVICE AND ROUTE GUIDING EXPLANATION SYSTEM

BACKGROUND OF THE INVENTION

1. Field of the Invention

The present invention relates to a route guiding explanation device and a route guiding explanation system and, more in particular, to a route guiding device provided by a car navigation system or the like for performing a route guidance for a driver of an automobile.

2. Description of the Related Art

A car navigation system (hereinafter referred to as a carnavi system) used inside an automobile is being popularized. The number of factory shipments of the carnavi in 1998 record 1,352,000 sets, which are 17.9% increase over the preceding year. Having a communication function, a map presentation with birds-eye-view function or the like, its functions are extremely advanced.

However, in a current carnavi system, its functions have been so advanced that the system has come to incorporate a number of functions which are not required for general users. As a result, a CPU (central processing unit) or memories of high-level functions have come to be required even for the level of a route guiding function. Also, since each manufacturer takes its own format for its route guiding information, the data thereof is not compatible with each other, thereby making it impossible for the general users to add or change route information data or the like and thus unable for them to add the route guiding information.

In the above described carnavi system, since it is possible to designate any and every site of the present location and the destination, there arises a problem that a large number of memories are required.

Also, since a detailed route between two sites is allowed to be dynamically prepared, it is necessary to introduce a complex algorithm for the automatic preparation of the route. As a result, there arises a problem that the CPU of high-level function is required. That is, there is a problem that the navigation system of the current carnavi system requires the CPU of high-level function or the large number of memories.

SUMMARY OF THE INVENTION

Hence, an object of the present invention is to solve the problem described as above and to provide a route guiding explanation device and a route guiding explanation system capable of making an addition or a change of route information or the like by the general users without having to require any CPU of high-level function or a large number of memories.

The route guiding explanation device according to the present invention is a route guiding explanation device for guiding a route to a destination as instructed while in traveling and comprises: landmark absolute position storing means for storing a pair of a landmark as a mark while in traveling and its absolute position; landmark section travel explanation storing means for storing route explanations on how to travel from a starting point landmark as a starting point and to a destination landmark as the end of a travel; first detecting means for detecting the landmark most close to the present location from the above described landmark absolute position storing means; second detecting means for detecting the landmark most close to the above described destination from the above described landmark absolute position storing means; and explanation renewing means for obtaining and informing route explanations from the above described landmark section travel explanation storing means based on each detecting result of the above described first and second detecting means.

The route guiding explanation system according to the present invention is a route guiding explanation system, including: a server device for storing a route guiding information to a destination as instructed while in traveling; and a navigation device for guiding a route by obtaining the above described route guiding information from the above described server device, in which the server device is provided with: landmark absolute position storing means for storing a pair of the landmark as a mark while in traveling and its absolute position; and landmark section travel explanation storing means for storing route explanations on how to travel from the starting point landmark as a starting point and to the destination landmark as a destination, and first detecting means for detecting the landmark most close to the present location from the above described landmark absolute position storing means, second detecting means for detecting the landmark most close to the above described destination from the above described landmark absolute position storing means, and explanation renewing means for obtaining and informing route explanations from the above described landmark section travel explanation storing means are provided for the above described navigation device.

That is, the route guiding explanation device according to the present invention comprises: landmark absolute position storing means for storing a landmark such as a location, a building or a bridge which becomes a mark while in traveling in a device for guiding a route to a destination when the driver instructs the destination while in traveling by an automobile; landmark section travel explanation storing means for storing route explanations in all combinations on how to travel from the starting point landmark as a certain starting point to the destination landmark as the destination; the present location absolute position obtaining portion for obtaining the driver's present location information; the present location absolute position storing portion for storing the value obtained by the present location absolute position obtaining portion; a destination obtaining portion for storing the position of the destination indicated by the driver; a destination absolute position converting portion for converting the destination stored in a destination storing portion into a absolute position; a destination absolute position storing portion for storing an output of the destination absolute position converting portion; a present location neighboring landmark storing portion for determining the landmark most close to a present location absolute position by calculating distances to the absolute positions of each landmark in a landmark absolute position storing portion by inputting the absolute position information of the present location of the present location absolute position storing portion and storing its landmark name; a destination neighboring landmark storing portion for determining the landmark most close to the destination absolute position by calculating distances to the positions of each landmark in the landmark absolute position storing portion by inputting the absolute position information of the destination of the destination absolute position storing portion and storing its landmark name; and a landmark section travel explanation renewing portion for regarding the value of a present location neighboring landmark storing portion and the value of the destination neighboring landmark storing portion as inputs and the value of the present location neighboring landmark storing portion as the starting point landmark by referring to a landmark section travel explanation storing portion and taking out and renewing for the driver the corresponding route explanations by regarding the value of the destination neighboring landmark as the destination landmark.

Also, in addition to the above mentioned structure, the route guiding explanation device of the present invention is provided with a landmark add-on portion for receiving the name and absolute position of a landmark when additional input instructions are received from the driver and adding the landmark and the absolute position to the landmark absolute position storing portion and subsequently adding a travel explanation to a landmark section travel explanation storing portion when the travel explanation between the landmark and the other landmark is received from the driver in terms of texts or sounds, and an explanation correcting portion for further receiving the starting point landmark name, a destination landmark name and a new explanation in terms of texts or sounds when explanation correction input instructions are received from the driver and replacing the travel explanation between the starting point landmark and the destination landmark in the landmark section travel explanation storing portion by the explanation newly received.

Configured in such a manner, the route guiding explanation device according to the present invention has the landmark information only such as a location, a building, an amusement park, a museum or the like which becomes a mark while in traveling. That is, the navigation is made in a landmark unit. Accordingly, only a rough navigation can be made in contrast to the conventional carnavi system.

However, depending on the number of landmarks set up, it is possible to substantially reduce the required number of memories in contrast to the past. Of course, the result will cause an inconvenience from the driver's point of view, and even if a random destination is instructed from a random present location, since no guidance is practically given from the present location to the most nearest landmark point, the driver must travel there by his own efforts.

Also, since the guidance is not given to the destination front but to the nearest landmark to the destination, from there too, the driver must travel to the destination by his own efforts.

For example, presume that the driver wants to travel to Musashi Nakahara station of Nanbu line located in Kawasaki city while he is currently traveling in the vicinity of Keio University located in Minato-ku, Tokyo. When the driver informs the device of his intention, it would be fine if Keio University is registered as a landmark, but if not, the driver must travel to Tokyo Tower which is the most nearest existing landmark by his own efforts.

On the other hand, when Musashi Nakahara station as a destination is not registered, a navigation is made up to Kawasaki Citizen Museum which is a landmark most nearest to Musashi Nakahara station from Tokyo Tower. However, since a route guiding from Kawasaki Citizen Museum to Musashi Nakahara station is not made, the driver must travel there by his own efforts.

Also, in the route guiding explanation device of the present invention, since the database portion of a navigation data is simply configured, it is easy for a large number of people to improve or update the database. Accordingly, a specific company does not control the database, but the database is instead configured such that the cooperative improvement of the system by a number of participants can be easily made, similar to an OS (operating system) by an open source. As for an internal data structure, the database takes a very simple configuration.

Therefore, it is possible to provide a carnavi system capable of cooperatively improving a route guiding database among a plurality of drivers. That is, it is possible to provide a simple and straightforward route guiding database without requiring a vast power of calculations. Also, it is easy to make the editing or the addition of a route guiding data portion or the like by the general users under a simple data structure. As a result, it is possible to improve the route guiding data by the cooperation of a large number of general users (automobile drivers).

BRIEF DESCRIPTION OF THE DRAWINGS

FIG. 1A is a drawing to show a configuration example of a landmark absolute position storing portion used in a route guiding explanation device according to one embodiment of the present invention.

FIG. 1B is a drawing to show a configuration example of a landmark section travel explanation storing portion used in the route guiding explanation device according to one embodiment of the present invention.

FIG. 1C is a drawing to show a configuration of a car navigation system used in the route guiding explanation device according to one embodiment of the present invention;

FIG. 2 is a drawing for explaining operations by the route guiding explanation device according to one embodiment of the present invention;

FIG. 6 is a block diagram to show the other configuration of the route guiding explanation device according to the other embodiment of the present invention.

DESCRIPTION OF THE PREFERRED EMBODIMENTS

Figure 3:
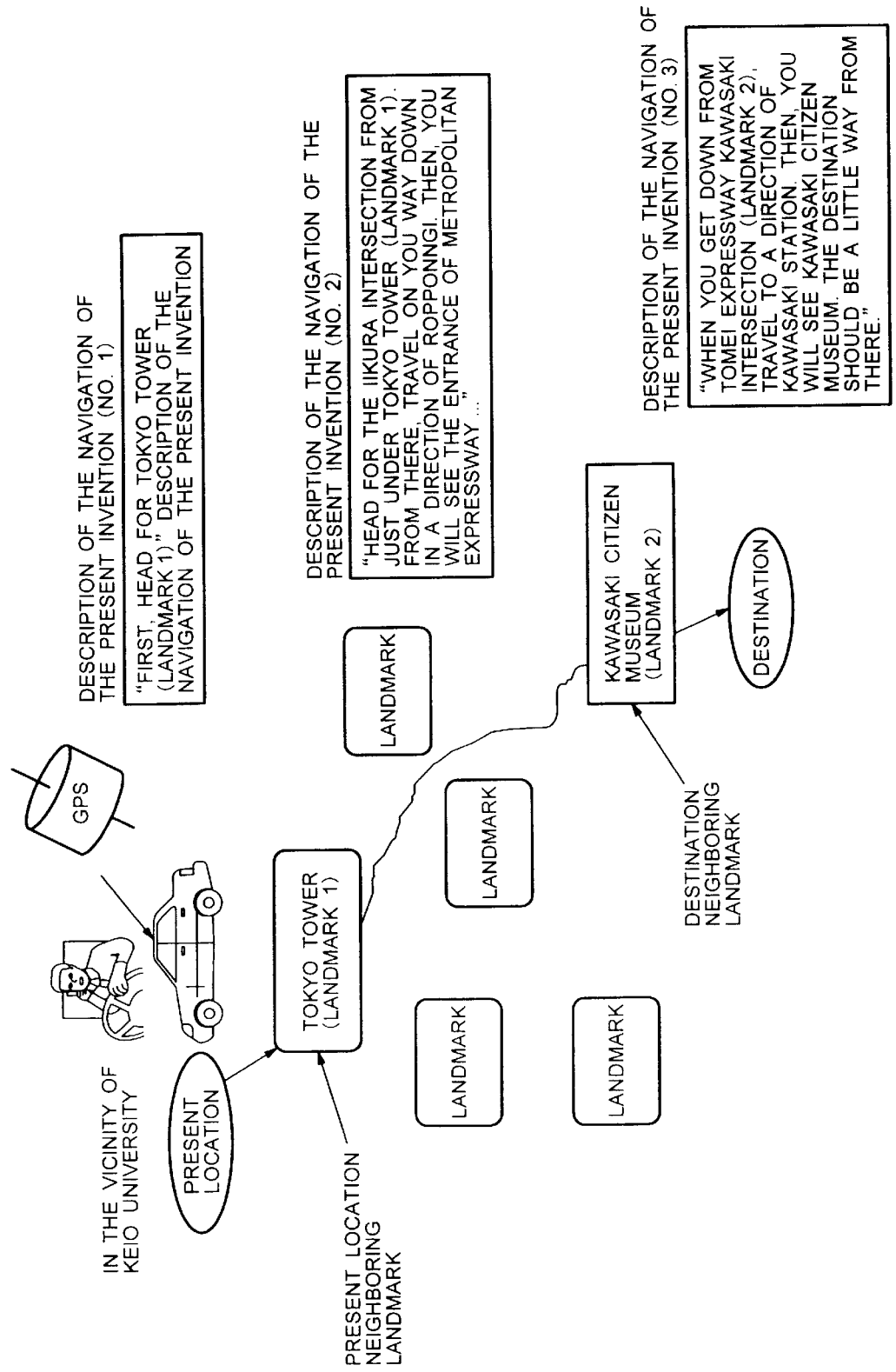
FIG. 3 is a drawing for explaining operations by the route guiding explanation device according to one embodiment of the present invention.

Next, referring to the drawings, embodiments of the present invention will be described below. FIG. 1A is a drawing to show a configuration example of a landmark absolute position storing portion used in a route guiding explanation device according to one embodiment of the present invention. FIG. 1B is a drawing to show a configuration example of a landmark section travel explanation storing portion used in the route guiding explanation device according to one embodiment of the present invention. FIG. 1C is a drawing to show a configuration of a car navigation system (hereinafter referred to as a carnavi system) used in the route guiding explanation device according to one embodiment of the present invention.

In the drawings FIG. 1A through FIG. 1C, 1, a landmark ((Land Mark) is abbreviated as LM in FIG. 1A) and its absolute position (longitude and latitude) are mentioned in a pair in a landmark absolute position storing portion 1. That is, in the landmark absolute position storing portion 1, the landmarks [LM1], [LM2], [LM3], [LM4], [LM5], [LM6]

and [LM7] and their absolute positions (X1, Y1), (X2, Y2), (X3, Y3), (X3, Y3), (X4, Y4), (X5, Y5), (X6, Y6) and (X7, Y7) are mentioned in a pair.

In a landmark section travel explanation storing portion 2, explanations for all combinations of a starting point landmark and a destination landmark are registered. In FIG. 1B, an example of the explanation is expressed where the starting point landmark is taken as LM4 and the destination landmark taken as LM6. The explanation in this case is expressed in terms of "When you travel the national highway X 10 Km toward the north from LM4, you will arrive at LM2. Then, turn to the right at the intersection Y and travel the prefectural highway Z 5 km toward the east and You will get out near LM5. Then, turn to the left at the intersection YY and travel the prefectural highway ZZ 3 km and you will arrive at LM6."

The carnavi system used in the route guiding explanation device according to one embodiment of the present invention is configured by a present location obtaining portion 3; a present location absolute position storing portion 4; a destination obtaining portion 5; a destination absolute position converting portion 6; a destination absolute position storing portion 7; a present location neighboring landmark storing portion 8; a destination neighboring landmark storing portion 9: and a landmark section travel explanation renewing portion 10.

FIG. 2 and FIG. 3 are drawings to explain operations by the route guiding explanation device according to one embodiment of the present invention. Referring to these FIG. 1 to FIG. 3, the route guiding explanation device according to one embodiment of the present invention will be described.

The present location obtaining portion 3 is capable of using GPS (Global Positioning System) or the like mounted on the existing carnavi system. An output of the present location obtaining portion 3 can be obtained in terms of longitudes and latitudes.

The present location absolute position storing portion 4 stores the latitude and longitude information calculated by the present location obtaining portion 3. The destination obtaining portion 5 is instructed by the driver and, in the examples as shown in FIG. 2 and FIG. 3, it is "Musashi Nakahara station."

The destination absolute position converting portion 6 converts a place name of the destination obtaining portion 5 into terms of longitude and latitude. In order to realize the conversion, there exists a number of possibilities. For example, by referring to an atlas where the longitude and latitude are mentioned, the driver may convert them manually. Alternatively, a corresponding list of place names and longitudes and latitudes or a software where search engines are provided may be referred. Here, the present invention does not specify any particular method, but only stipulates that the destinations be converted into longitudes and latitudes by whatever means available.

The destination absolute position storing portion 7 stores the longitudes and latitudes of destinations converted by the destination absolute position converting portion 6. The present location neighboring landmark storing portion 8 compares the longitudes and latitudes information of the present location absolute position storing portion 4 with the absolute positions of each landmark in the landmark absolute position storing portion 1 and selects the most nearest landmark in a distance and stores it.

The destination neighboring landmark storing portion 9 compares the longitudes and latitudes information of the destination absolute position storing portion 7 with the absolute positions of each landmark in the landmark absolute position storing portion 1 and selects the most nearest landmark in a distance and stores it.

The landmark section travel explanation renewing portion 10 inputs the value of the present location neighboring landmark storing portion 8 and the value of the destination neighboring landmark storing portion 9 and, by referring to the landmark section travel explanation storing portion 2, regards the value of the present location neighboring landmark storing portion 8 as the starting point landmark and the value of the destination neighboring landmark storing portion 9 as the destination landmark and takes out the explanations thereof and renews them for the driver. If the explanations are stored in terms of texts, they are renewed by a voice synthetic device (not shown) and, corresponding sound output device (not shown).

Figure 4:
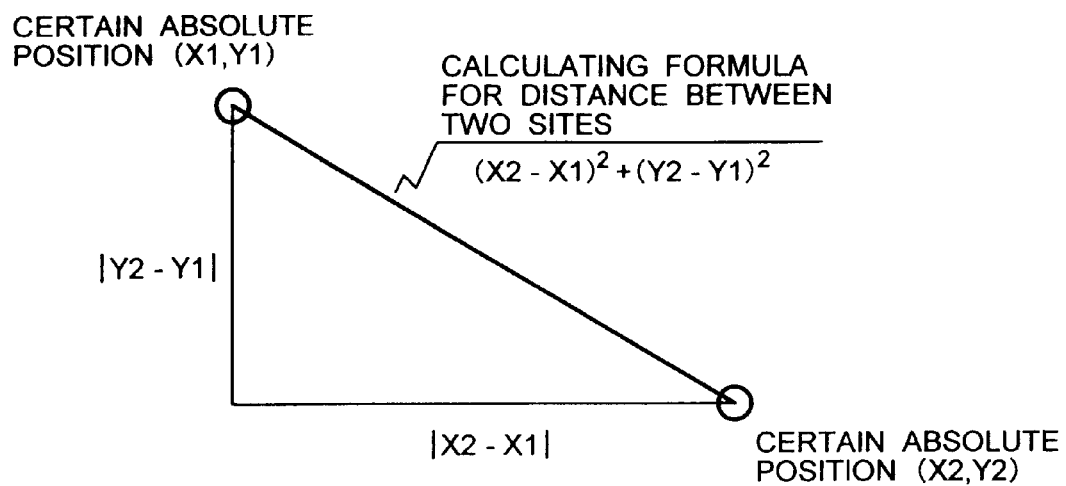
FIG. 4 is a drawing to show one example of a distance calculation method in the carnavi system as shown in FIG. 1C.

FIG. 4 is a drawing to show one example of a distance calculating method in the carnavi system as shown in FIG. 1C. By referring to the FIG. 4, the distance calculating method used in the present location neighboring landmark storing portion 8 will be described.

If two absolute locations are given as (X1, Y1) and (X2, Y2), the calculating method thereof is the square root of the sum of the square of (X2−X1) and the square of (Y2−Y1). That is, $$\text{Distance} = [(X2-X1)^2 + (Y2-Y1)^2]^{1/2}$$

can be calculated in the above expression. This distance calculating method is used in the present location neighboring landmark storing portion 8 and the destination neighboring landmark storing portion 9.

Configured by the above manner, the present embodiment has only the landmark information such as a location, an amusement park and a museum which becomes a mark while in traveling, that is, makes a navigation in a landmark unit. Accordingly, only a rough navigation can be made in contrast to the conventional carnavi system.

However, depending on the number of landmarks set up, it is possible to substantially reduce the required number of memories in contrast to the past. Of course, the result will cause an inconvenience from the driver's point of view, and even if a random destination is instructed from a random present location, since no guidance is practically given from the present location to the most nearest landmark point, the driver must travel there by his own efforts.

Also, since the guidance is not given to the destination front but to the nearest landmark to the destination, from there too, the driver must travel to the destination by his own efforts.

For example, as shown in FIG. 2 and FIG. 3, presume that the driver wants to travel to Musashi Nakahara station of Nanbu line located in Kawasaki City while he is currently traveling in the vicinity of Keio University located in Minato-ku, Tokyo. When the driver informs the device of his intention, it would be fine if Keio University is registered as a landmark, but if not, he must travel to Tokyo Tower which is the most nearest existing landmark by his own efforts.

In this case, the driver is to "show the absolute position of Musashi Nakahara station" or "refer to place names and a conversion list of their absolute positions." Then, "Tokyo Tower (Landmark 1)" is selected as the present location neighboring landmark and stored.

After that, route explanations are taken out and renewed. For example, the route explanations are renewed in such terms as [First, head for Tokyo Tower (landmark 1)]

[Navigation explanation (part 1)] [Head for the Iikura intersection from just under Tokyo Tower (landmark 1). From there, travel on your way down in a direction of Roppongi. Then, you will see the entrance of Metropolitan Expressway. . . . ] "Navigation explanation (part 2)."

On the other hand, when Musashi Nakahara station as a destination is not registered, a navigation is made from Tokyo Tower to Kawasaki Citizen Museum which is the most nearest landmark to Musashi Nakahara station. However, since no guidance is made from Kawasaki Citizen Museum to Musashi Nakahara station, the driver must travel from Kawasaki Citizen Museum to Musashi Nakahara station by his own efforts.

In this case, the driver is to "show the absolute position of Musashi Nakahara station.", or "show a location on the map.", or "refer to place names and a conversion list of absolute positions." Then, "Kawasaki Citizen Museum (landmark 2)" is selected as the destination neighboring landmark and stored.

After that, the route explanations are taken out and renewed. For example, the route explanations are renewed in such terms as "when you get down from Tomei Expressway Kawasaki Intersection, travel to a direction of Kawasaki station. Then, you will see Kawasaki Citizen Museum (landmark 2). The destination should be a little way from there." "Navigation explanation (part 3)."

Figure 5:
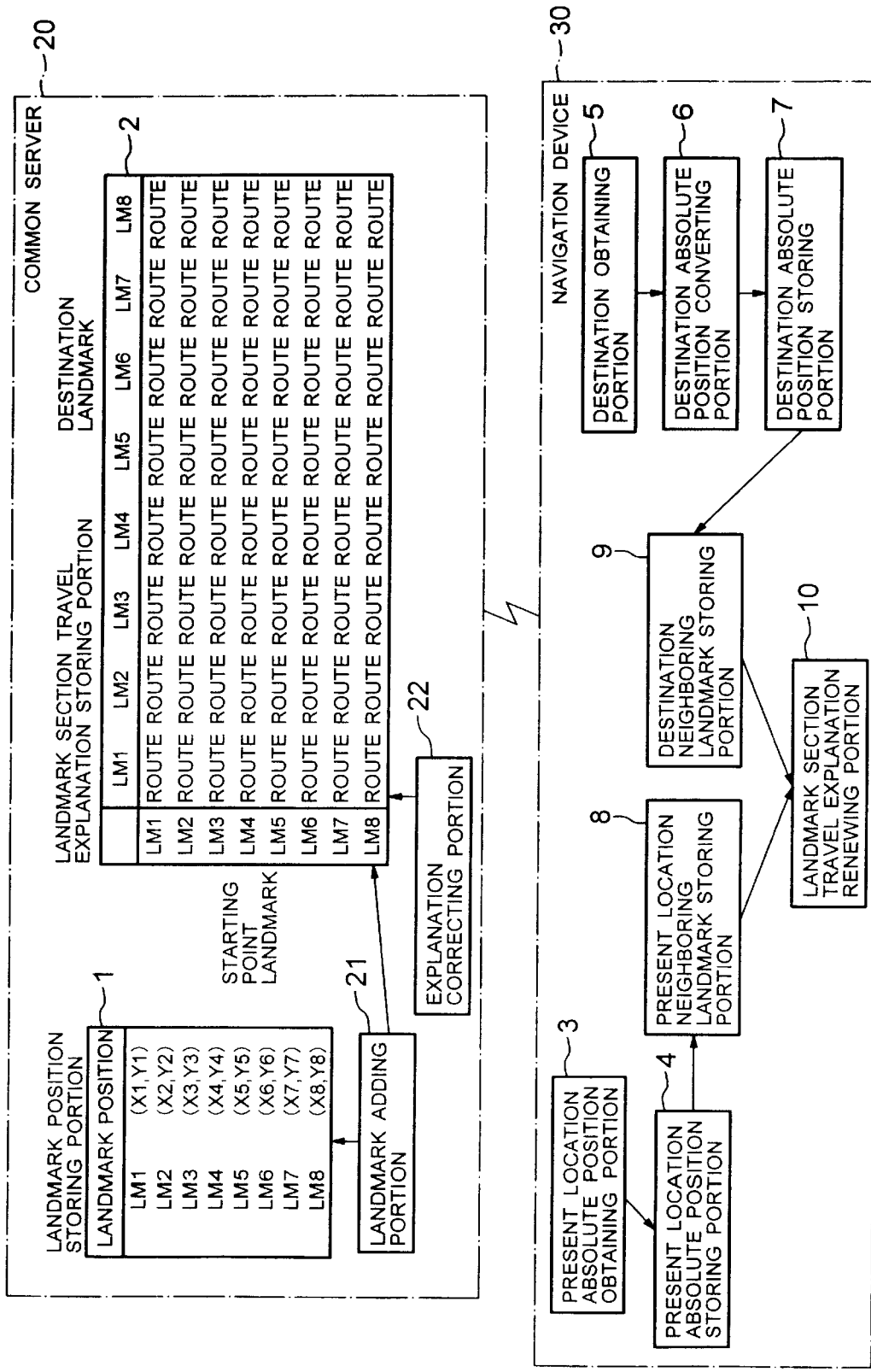
FIG. 5 is a block diagram to show a configuration of the route guiding explanation device according to the other embodiment of the present invention.

FIG. 5 is a drawing to show a configuration of the route guiding explanation device according to the other embodiment of the present invention. In FIG. 5, the other embodiment of the present invention as against the above described one embodiment of the present invention has a configuration wherein the sharing of the navigation data by a large number of participants and a facility for improved editing are added and extended. That is, the other embodiment of the present invention has the same configuration as that of one embodiment of the present invention except that the landmark absolute position storing portion 1 and the landmark section travel explanation storing portion 2 are provided in a common server 20 and a landmark adding portion 21 and an explanation correcting portion 22 are added to the common server 20, and the same reference numerals are attached to the same components.

As described above, the landmark absolute position storing portion 1, the landmark section travel explanation storing portion 2, the landmark adding portion 21 and the explanation correcting portion 22 are positioned as the common server 20 which is owned jointly by a large number of participants.

The components other than those, that is the present location obtaining portion 3, the present absolute position storing portion 4, the destination obtaining portion 5, the destination absolute position converting portion 6, the destination absolute position storing portion 7, the present location neighboring landmark storing portion 8, the destination neighboring landmark storing portion 9 and the landmark section travel explanation renewing portion 10 exist as a navigation device 30 in each automobile and these common server 20 and the navigation device 30 are connected by a radio network which is not shown.

When the landmark adding portion 21 receives new landmark adding input instructions from the driver, it receives place names and their absolute positions and add the new landmarks and their absolute positions to the landmark absolute position storing portion 1. Next, when the landmark adding portion 21 receives travel explanations for the section between the new landmarks and other landmarks in terms of texts or voices from the driver, it adds them to the landmark section travel explanation storing portion 2.

When the explanation correcting portion 22 receives explanation correcting input instructions from the driver, it further receives starting point landmark names, destination landmark names and new explanations and replaces the explanations between the starting point landmark and the destination landmark in the landmark section travel explanation storing portion 2 by explanations newly received. The new explanations are inputted in terms of texts or voices.

Those other than the above described operations are the same as one embodiment of the present invention. However, in one embodiment of the present invention, nothing particular has been done for the access to the landmark position storing portion 1 and the landmark section travel explanation storing portion 2. That is, it is possible for all the components to exist inside the automobile, or the landmark position storing portion 1 and the landmark section travel explanation storing portion 2 may exist in the server with the access to them made by the radio network.

However, in the other embodiment of the present invention, the landmark position storing portion 1 and the landmark section travel explanation storing portion 2 always exist in the common server 20 and are limited to the configuration where the access is made by a large number of participants by the radio network.

FIG. 6 is a block diagram to show the other configuration example of the route guiding explanation device according to the other embodiment of the present invention. In FIG. 6, the common server 20 exists in the center and the navigation devices 31 to 33 are mounted on each automobile. The access from the navigation devices 31 to 33 to the database 23 of the common server 20 including the landmark position storing portion 1 and the landmark section travel explanation storing portion 2 is made by the radio network 40.

In this manner, the navigation system is made to have such a very simple data structure that it can be realized even with the CPU of low-level function and a small number of memories. Also, since the navigation database is placed on the side of the server so that the database can be updated by a large number of drivers, a gradual improvement of the navigation database becomes possible. This is made possible by having the database owned jointly and a very simple structure and unattainable by having a complex data structure and a close mechanism such as the current commercial carnavi system.

Accordingly, in the present invention, since the database portion of a navigation data is simply configured, it is easy for a large number of people to make the improvement or the addition of the database. Also, a specific company does not control the database, but the database is instead configured such that it is easy to make the cooperative improvement of the system by a large number of participants, similar to the OS (operating system) by the open source. As for the internal structure, the database takes a very simple configuration.

Therefore, it is possible to provide a carnavi system capable of cooperatively improving the route guiding database among a plurality of drives. That is, it is possible to provide a simple and straightforward route guiding function without requiring any vast power of calculations. Also, it is simple to make the editing or the addition of the route guiding data portion by the general users under a simple data structure. As a result, it is possible to improve the route guiding data by the cooperation of the general users (automobile drivers). Note that, while the carnavi system has been described in the above description, it can also be applied to the navigation system used by pedestrians or the like.

As described above, according to the present information, the route guiding explanation device for guiding a route to the destination as instructed while in traveling provides the advantage of making the addition or the correction of the route information data or the like by the general users without requiring the CPU of high-level function and a large number of memories by providing: landmark absolute position storing means for storing a pair of the landmark as a mark while in traveling and its absolute position; landmark section travel explanation storing means for storing route explanations on how to travel from the starting point landmark as a starting point to the destination landmark as a destination; first detecting means for detecting the landmark which is the most nearest to the present location from the landmark absolute position storing means; second detecting means for detecting the landmark which is the most nearest to the destination from the landmark absolute position storing means; and explanation renewing means for obtaining and informing route explanations from the landmark section travel explanation storing means based on each detecting result of the first and the second detecting means.

What is claimed is:

1. A route guiding explanation device for guiding a route to a destination as instructed while in traveling, comprising:
    landmark absolute position storing means for storing a pair of a landmark as a mark while in traveling and its absolute position;
    landmark section travel explanation storing means for storing route explanations on how to travel from a starting point landmark as a starting point to a destination landmark as the destination;
    first detecting means for detecting the landmark which is a most nearest to a present location from said landmark absolute position storing means;
    second detecting means for detecting the landmark which is a most nearest to said destination from said landmark absolute position storing means; and
    explanation renewing means for obtaining and informing route explanations from said landmark section travel explanation storing means based on each detecting result of the first and the second detecting means.

2. The route guiding explanation device according to claim 1, further comprising:
    obtaining means for obtaining absolute position information of said present location; and
    converting means for converting said destination into an absolute position.

3. The route guiding explanation device according to claim 2, wherein said first detecting means is configured so as to calculate distances between the absolute position of said present location obtained by said obtaining means and the absolute positions of each landmark in said landmark absolute position storing means and to detect the landmark which is a most nearest to the absolute position of said present location.

4. The route guiding explanation device according to claim 2, wherein said second detecting means is configured so as to calculate distances between the absolute position of said destination converted by said converting means and the absolute positions of each landmark in said landmark absolute position storing means and to detect the landmark which is a most nearest to the absolute position of said destination.

5. The route guiding explanation device according to claim 1, wherein said explanation renewing means regards the landmark detected by said first detecting means as the starting point landmark and the landmark detected by said second detecting means as a destination landmark and to take out and renew corresponding route explanations from said landmark section travel explanation storing means.

6. The route guiding explanation device according to claim 1, wherein said route explanations comprises at least either of voices and text data.

7. The route guiding explanation device according to claim 1, further comprising:
    landmark adding means for adding a name and its absolute position of relevant landmark to said landmark absolute position storing means at the time of inputting an addition of a new landmark as instructed; and
    explanation adding means for adding route explanations to said landmark section travel explanation storing means at the time of inputting route explanations between relevant landmark and the other landmark.

8. The route guiding explanation device according to claim 1, further comprising correcting means for updating corresponding route explanations in said landmark section travel explanation storing means by corrected route explanations at the time of inputting corrections of said route explanations as instructed.

9. A route guiding explanation system, comprising:
    a server device for storing route guiding information to a destination as instructed while in traveling; and
    a navigation device for guiding a route by obtaining said route guiding information from said server device,
    wherein said server device is provided with:
        landmark absolute position storing means for storing a pair of the landmark as a mark while in traveling and its absolute position; and
        landmark section travel explanation storing means for storing route explanations on how to travel from the starting point landmark as a starting point and to the destination landmark as a destination, and
    wherein first detecting means for detecting the landmark which is the most nearest to the present location from said landmark absolute position storing means, second detecting means for detecting the landmark which is the most nearest to said destination from said landmark absolute position storing means and explanation renewing means for obtaining and informing route explanations from said landmark section travel explanation storing means based on each detecting result of said first and second detecting means are provided for said navigation device.

10. The route guiding explanation system according to claim 9, wherein said navigation device includes:
    obtaining means for obtaining an absolute position information of said present location; and
    converting means for converting said destination into an absolute position.

11. The route guiding explanation system according to claim 10, wherein said first detecting means is configured so as to calculate distances between the absolute position of said present location obtained by said obtaining means and the absolute positions of each landmark in said landmark absolute position storing means and to detect the landmark which is a most nearest to said present location.

12. The route guiding explanation system according to claim 11, wherein said second detecting means is configured so as to calculate distances between the absolute position of said destination converted by said converting means and the absolute positions of each landmark in said landmark absolute position storing means and to detect the landmark which is a most nearest to the absolute position of said destination.

13. The route guiding explanation system according to claim 9, wherein said explanation renewing means is configured so as to regard the landmark detected by said first detecting means as the starting point landmark and the landmark detected by said second detecting means as a destination landmark and to take out and renew corresponding route explanations from said landmark section travel explanation storing means.

14. The route guiding explanation system according to claim 9, wherein said route explanations comprises at least either of voices and text data.

15. The route guiding explanation system according to claim 9, wherein said server device includes:

landmark adding means for adding a name and its absolute position of a relevant landmark to said landmark absolute position storing means at the time of inputting the addition of the new landmark as instructed; and explanation adding means for adding the route explanations to said landmark section travel explanation storing means at the time of inputting the route explanations between relevant landmark and the other landmark.

16. The route guiding explanation system according to claim 9, further comprising correcting means for updating corresponding route explanations in said landmark section travel explanation storing means by corrected route explanations at the time of inputting the correction of said route explanations as instructed.

17. The route guiding explanation system according to claim 9, further comprising a radio network in which said server device and said navigation device are connected by a radio.

* * * * *